Jan. 7, 1964   W. A. WATHEN ETAL   3,116,582
HAY CRUSHERS
Filed May 5, 1961   5 Sheets-Sheet 1

INVENTORS.
WILLIAM A. WATHEN,
BY MERLE H. PETERSON &
JOHN C. KOEPELE

ATTORNEYS.

INVENTORS.
WILLIAM A. WATHEN,
MERLE H. PETERSON &
JOHN C. KOEPELE
BY Wolfe, Hubbard, Voit & Osann
ATTORNEYS.

INVENTORS.
WILLIAM A. WATHEN,
BY MERLE H. PETERSON &
JOHN C. KOEPELE

ATTORNEYS.

Jan. 7, 1964 W. A. WATHEN ETAL 3,116,582
HAY CRUSHERS
Filed May 5, 1961 5 Sheets-Sheet 5

INVENTORS.
WILLIAM A. WATHEN,
BY MERLE H. PETERSON &
JOHN C. KOEPELE

ATTORNEYS.

United States Patent Office 3,116,582
Patented Jan. 7, 1964

3,116,582
HAY CRUSHERS
William A. Wathen, Merle H. Peterson, and John C. Koepele, Detroit, Mich., assignors to Massey-Ferguson Inc., Detroit, Mich., a corporation of Maryland
Filed May 5, 1961, Ser. No. 108,197
9 Claims. (Cl. 56—1)

The invention relates to apparatus for conditioning hay and other forage crops and more particularly to agricultural implements of the type known as hay crushers in which the crop material is conditioned by feeding it between a pair of crushing rolls.

In hay crushers of the above general character the crushing rolls are usually mounted on a frame fitted with wheels that can be moved vertically to raise and lower the implement between transport and working positions. The rolls of course are disposed transverse to the path traveled by the implement and one of the rolls is customarily mounted so that it can be moved into contact with or separated from the companion roll. Linkages have been devised for automatically separating the rolls as an incident to their being raised to transport position, the linkage acting reversely to press the rolls together when they are lowered to working position.

One object of the invention is to provide a hay crusher of the above general type embodying improved means for yieldably pressing the crushing rolls together when in working position which permits the pressure on the rolls to be relieved for clearing struck material from between the rolls without requiring them to be raised to transport position.

Another object is to provide means for yieldably pressing the crushing rolls together with adequate force for effective hay crushing which permits the rolls to separate in the event of material sticking to and building up on the rolls without subjecting the rolls or other supported structure to excessive stresses.

Still another object is to provide a wheeled hay crushing implement having means for raising and lowering the implement between transport and working positions and embodying novel mechanism by which the pressure on the crushing rolls is regulated incident to the movement of the implement in a portion of its range from working position and by which the rolls are separated in the movement of the implement through the remainder of its range to transport position.

A further object is to provide tensioning mechanism for the crushing rolls of an implement including spring means conditioned by the weight of the implement for pressing the rolls as they are lowered from transport to working position and embodying novel means for locking the tensioning mechanism to preclude bouncing of the rolls when the implement is traveling over an irregular ground surface.

It is also an object of the invention to provide a hay crusher of simplified construction which can be manufactured economically, which is efficient and reliable in operation, easy to clear of stuck material and which is extremely durable and dependable in use.

Other objects and advantages of the invention will become apparent from the following detailed description of the preferred embodiment illustrated in the accompanying drawings in which.

While a single illustrative embodiment of the invention has been shown and will be described herein, it is to be understood that this is not intended to limit the invention to that specific embodiment, the intention being to cover all modifications and adaptations falling within the spirit and scope of the invention as more broadly or generally characterized in the appended claims.

Figure 1:
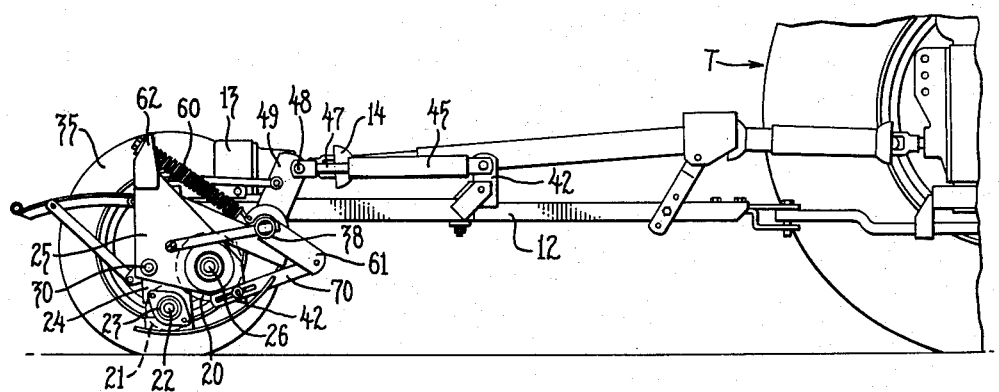
FIGURE 1 is a side elevational view of a hay crusher embodying the features of the invention, the ground wheel on the near side being omitted to show details of construction.
Figure 2:
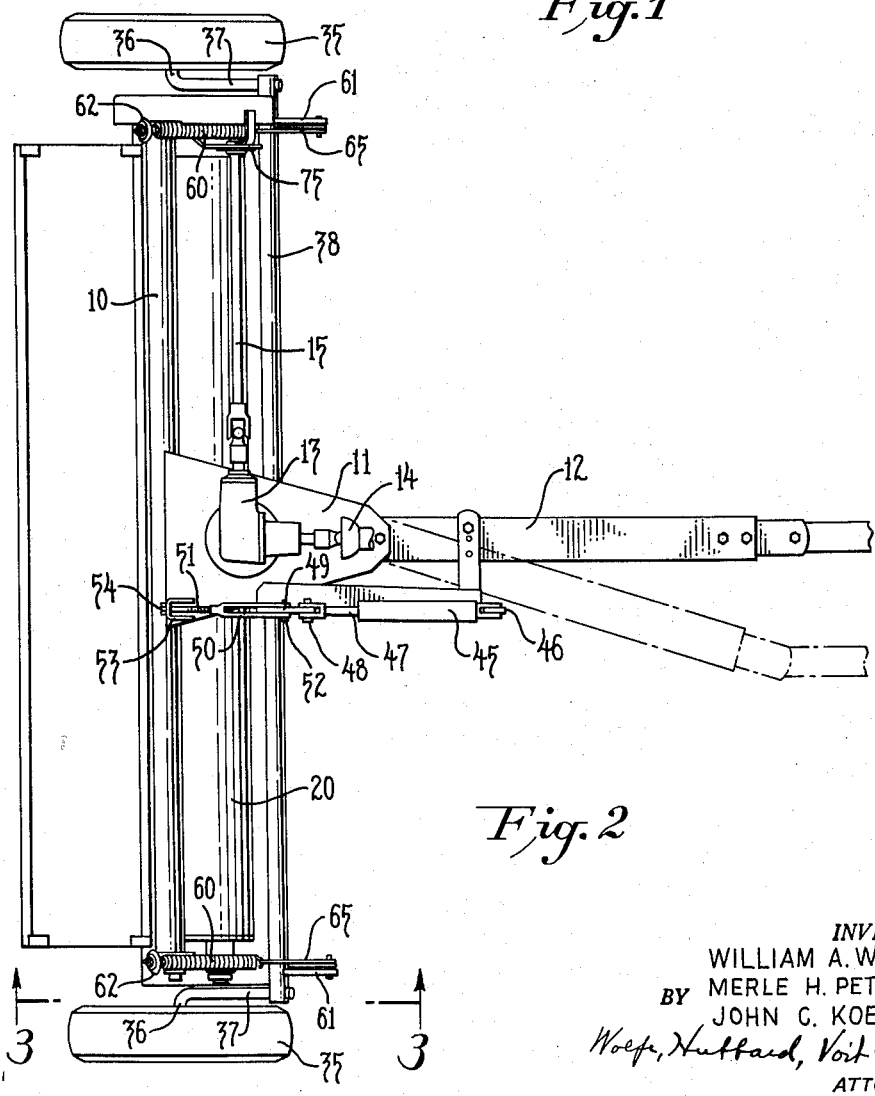
FIG. 2 is a top view of the hay crusher shown in FIG. 1.
Figure 3:
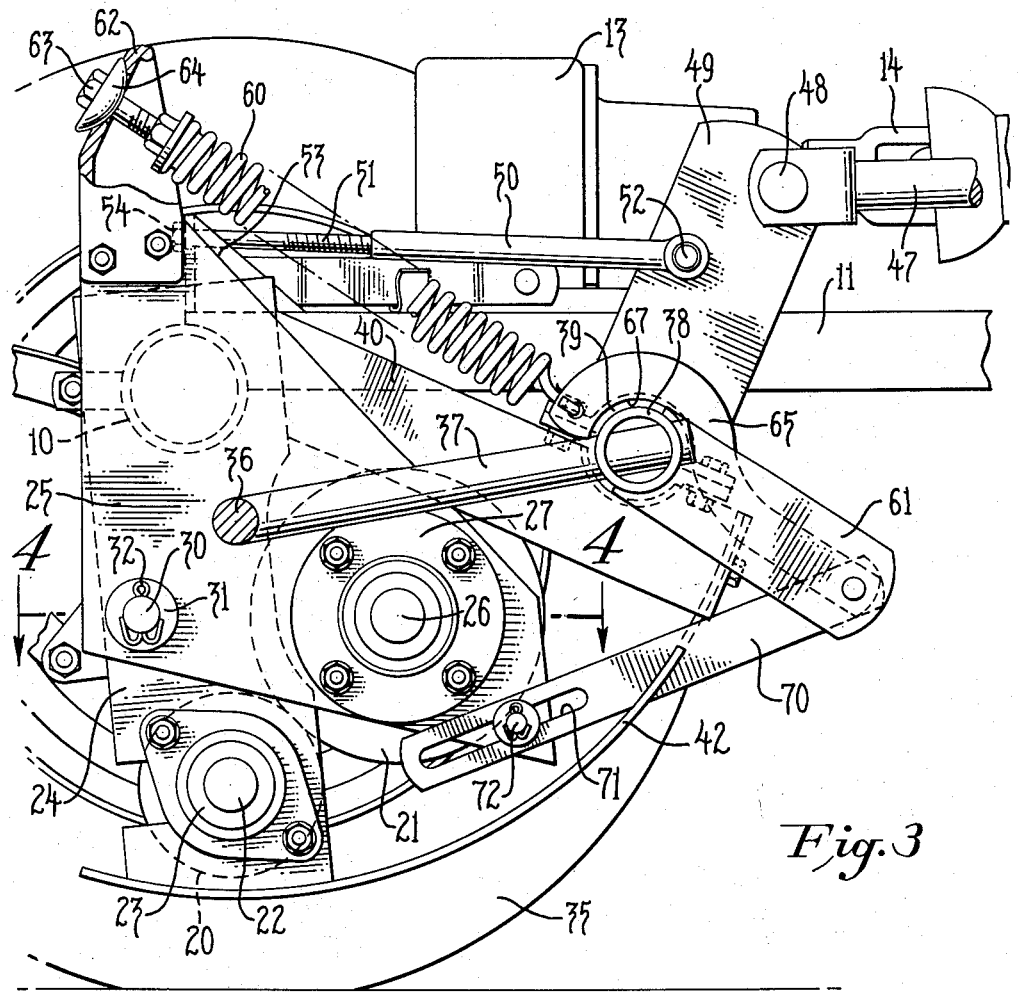
FIG. 3 is a partially sectioned end view through the hay crusher taken in a plane substantially on the line 3—3 of FIG. 2, the parts being shown with the crushing rolls in working position.
Figure 8:
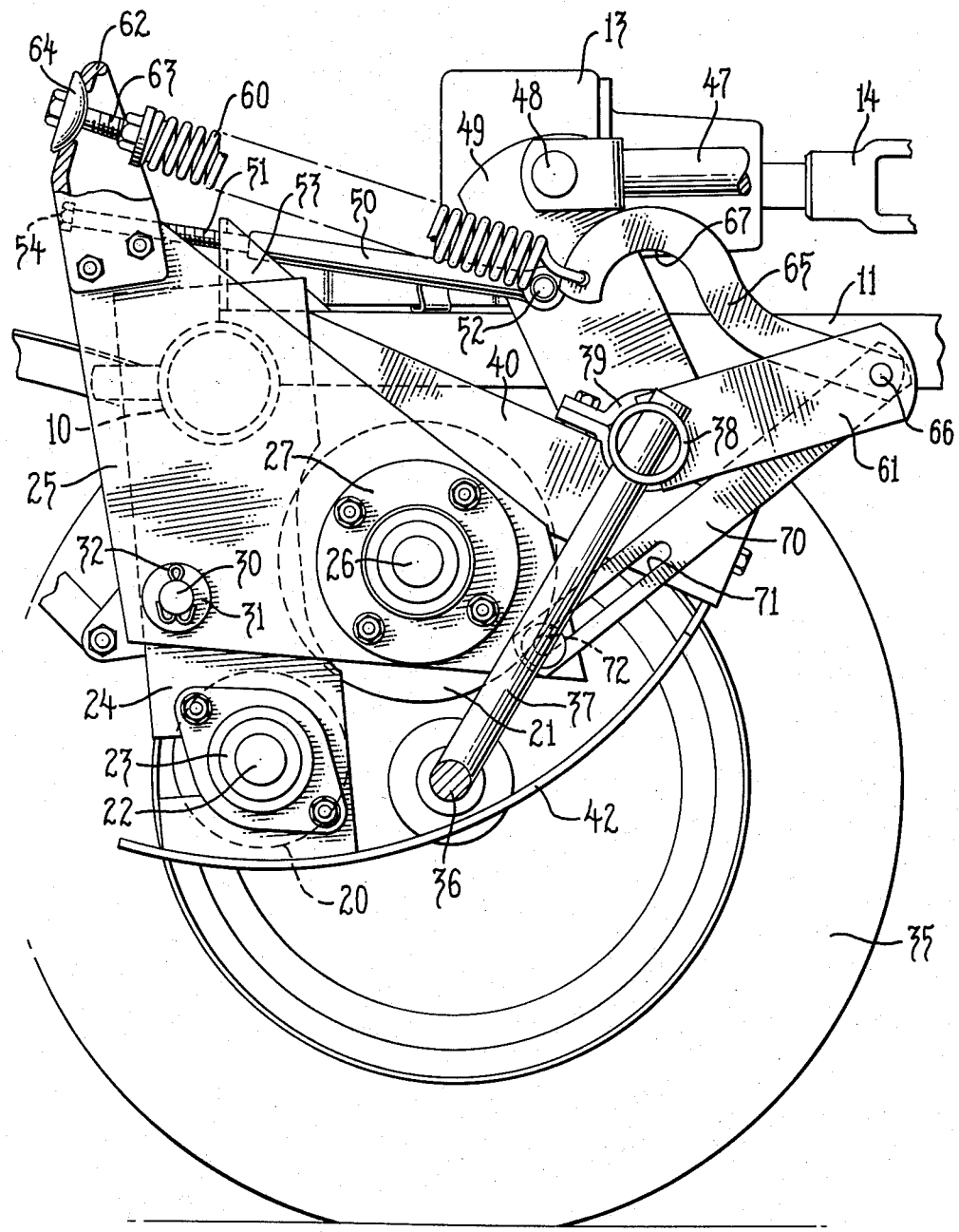
FIG. 8 is a view similar to FIG. 3 showing the implement raised to transport position with the crushing rolls separated.

By way of illustration the invention has been shown as incorporated in a hay conditioning implement or hay crusher having a rigid main frame including a transverse tubular member 10 (FIGS. 2, 3 and 8). Welded or otherwise attached to the member 10 midway between its ends is a generally triangular plate 11 to which is secured a draft member or tongue 12 by which the implement is connected to a towing vehicle, as for example, a tractor T (FIG. 1). The plate 11 forms a support for a beveled gear box 13, the input gear of which is connected by a universally jointed drive shaft 14 with the power take off shaft of the tractor. The output gear of the gear box drives a laterally extending power shaft 15, the functions of which will be described in detail later on.

Rotatably supported in parallel relation below the main frame are a pair of crusher rolls 20 and 21. The roll 20 which, in this instance, is the lower of the two rolls, has shaft extensions 22 projecting at opposite ends and journaled in bearings 23 carried by rigid legs 24 welded to and depending from opposite ends of the cross member 10.

Figure 4:
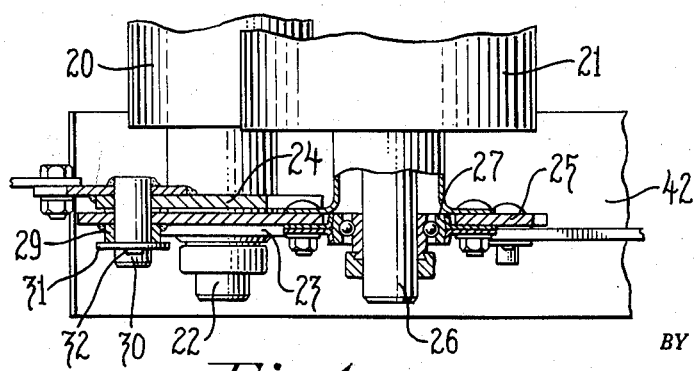
FIG. 4 is a fragmentary sectional view taken in a plane substantially on the line 4—4 of FIG. 3.

To provide for relative movement between the lower and upper rolls 20 and 21 in a transaxial direction, the latter roll is rotatably supported on bell cranks 25 respectively pivoted intermediate their ends on the depending legs 24 of the main frame. Thus, as shown in FIGS. 3 and 4, roll 21 has shaft extensions 26 projecting at each end and journaled in bearings 27 carried on corresponding arms, in this instance the lower, horizontally projecting arms of the bell cranks 25.

The bell cranks 25 are shown in this instance as generally triangular metal plates. Each has a hole adjacent its apex with an alined bushing 29 which may be welded to the plate for receiving a pivot pin 30. The pivot pins are welded to and project laterally from the respective frame legs 24. Washers 31 and cotter pins 32 retain the bell cranks in assembled relation with the other parts of the implement while permitting the bell cranks to rock fore-and-aft about their pivots. It will be observed that by rocking the bell cranks on their pivots 30, the roll 21 may be moved into contact with the roll 20 as shown in FIG. 3 or separated from it as shown in FIG. 8.

Figure 7:
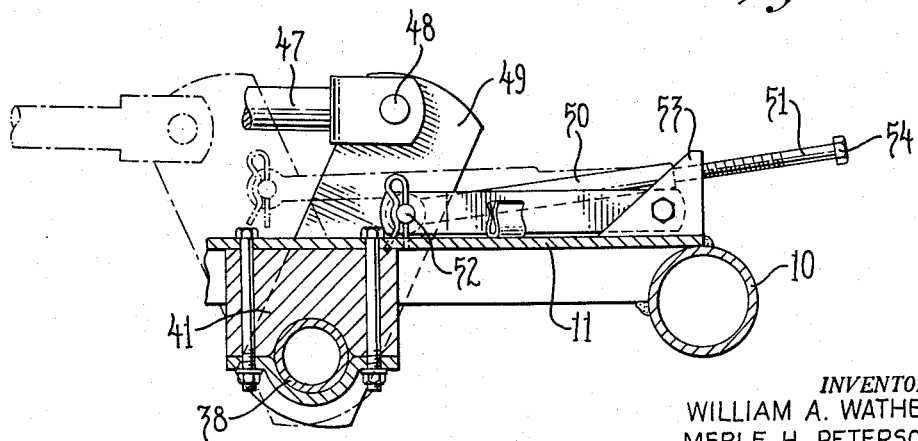
FIG. 7 is a fragmentary sectional view taken in a plane substantially on the line 7—7 of FIG. 6.

The main frame of the exemplary implement is supported by ground wheels 35 disposed at opposite sides of the frame and mounted for vertical movement whereby the crushing rolls 20, 21 may be lowered into the working position in which they are shown in FIG. 3 or raised to the transport position in which they are shown in FIG. 8. For this purpose the ground wheels are journaled on axles 36 formed at the outer ends of rigid arms 37 secured to and projecting radially from a tubular rocking shaft 38 extending transversely across and rotatably supported on the main frame. In the particular embodiment illustrated the rock shaft 38 is journaled in bearings 39 carried by arm 40 rigidly with and extending downwardly from the frame member 10 adjacent its opposite ends. A suitable bearing may also be provided centrally of the rock shaft, such bearing being in the form of a split block 41 bolted to the underside of the plate 11 as shown in FIG. 7. The arms 40 also support arcuate shields 42 which extend under the roll supporting bearings and prevent crop material from becoming entangled therein. The shields are conveniently supported at their lower ends on the legs 24 of the frame.

Power operated means is provided for rocking the shaft 38 to move the ground wheels downwardly and thus raise the implement and crushing rolls to transport position. The arrangement is such that the weight of the implement is effective to rock the shaft in the opposite direction for lowering the implement and rolls to the working position in which the rolls are positioned to pick up crop material from a window as the implement is drawn along by the tractor. The power operated means as herein shown comprises the pressure fluid operated actuator or hydraulic ram having a cylinder 45 anchored to a bracket 46 fixed to the draft member 12 as shown in FIGS. 1 and 2. The cylinder is fitted with the usual working piston having a rod 47 projecting from its rearwardly facing end and pivotally connected as by a pin 48 (FIG. 3) and with a crank arm 49 welded to and projecting radially from the rock shaft 38.

Upon delivery of pressure fluid to the closed forward end of the cylinder 45, the piston is forced rearwardly and, through the rod 41 and arm 49, rocks the shaft 38 counterclockwise as viewed in FIG. 3. This action moves the wheels downwardly relative to the frame and thus raises the frame and crushing rolls upwardly to the transport position as shown in FIG. 8. When fluid is allowed to exhaust from the cylinder, the weight of the implement acting through the arms 37 and 49 forces the piston back into the cylinder and the frame and the crushing rolls descend to the working position in which they are shown in FIG. 3.

Suitable stop means is provided for limiting the downward movement of the frame to accurately define the working position of the rolls. While this stop means may be of any preferred character, it is shown herein as comprising an elongated rod made up of two sections 50 and 51 threaded together for adjustment of its effective length. One end of the composite rod, in this instance the end of the section 50, is pivotally connected to the crank arm 49 as by a pin 52. The other end of the rod, in this instance the section 51, is inserted through a clearance hole in an L-shaped bracket 53 welded to the frame plate 11 as shown in FIG. 7. Rod section 51 is formed with a head 54 at its outer end, the head being larger in diameter than the clearance hole to enable it to engage the bracket 53 and positively prevent further rocking of the shaft 38 when the implement reaches the working position. To provide for adjustment of the working position, the head 54 may be shaped for engagement by a wrench or similar tool by which the rod section 51 may be screwed into or out of section 50.

In accordance with one aspect of the invention, tensioning mechanism actuated by the weight of the implement is provided for yieldably urging the roll 21 against the roll 20. More specifically, through the novel construction of this mechanism, the crushing rolls are pressed together as an incident to the implement being lowered to working position yet pressure on the rolls may be relieved to permit celaring stuck crop material therefrom without raising the implement all the way to transport position. It is to be particularly noted that this pressure relief does no require actual separation of the crushing rolls which is unnecessary for clearing the rolls of slugs of material that may stick to them in the operation of the implement.

The tensioning mechanism in its presently illustrated form includes heavy tension springs 60 connected between the upper arms of the bell cranks 25 and crank arms 61 fixed to and projecting radially from the rock shaft 38. Each bell crank 25 has bolted or otherwise secured to its upper end a bracket 62 to which one end of the spring 60 is anchored as by a ball and socket connection permitting relative angular movement between the spring and the bell crank. In the exemplary embodiment this connection is provided by a headed bolt 63 inserted through an aperture in the bracket and suitably secured to one end of the spring 60. A spherically surfaced washer 64 mounted on the bolt adjacent its head engages a complementally shaped socket formed in the bracket 62 (see FIG. 3).

At the end remote from the bracket 62, each spring 60 is secured to one end of a link 65 which is pivotally connected at its other end as by a pin 66 to the projecting end of the crank arm 61. In accordance with another aspect of the invention the link 65 is curved or formed with a cut out section as at 67 affording clearance for the shaft 38 when the latter is rocked so as to extend the crank arm 61 substantially parallel to the axis of the spring 60 but at the opposite side of the shaft as shown in FIG. 3. With this arrangement the springs act radially on the shaft 38 and exert no torque on it when fully tensioned for operation. Indeed, the spring acts so as to apply a transverse force on the rock shaft rather than a rotative or torque force.

Preferably the stop rods 50, 51 are adjusted so that the crank arms 61 are swung slightly over center as the crushing rolls move into working position. Accordingly, the tensioning mechanism is locked in spring tensioning position. As the force urging the crushing rolls together is derived solely from the tension springs 60, slugs of material sticking to the rolls are enabled to spread the rolls apart by simply extending the springs a bit farther. Separation of the rolls under this condition does not involve rocking of the shaft 38 and lifting of the implement and consequently the forced roll separation by slugs of crop material does not impose excessive stresses on the rolls or their supporting structure.

In accordance with still another aspect of the invention, provision is made so that if desired, the crushing rolls 20, 21 may be separated automatically as an incident to the implement being raised to transport position. To provide for such separation, each of the crank arms 61 is connected by a tension link 70 with the roll supporting bell crank 25 with which it is associated. Link 70 may be connected with the crank arm by the pivot pin 66 which connects the link 65 to the crank arm. To permit roll pressure to be relieved without actual separation of the crushing rolls, the connection with the bell crank is preferably a lost motion connection. As herein shown this connection is effected through an elongated slot 71 in the link adapted to engage over a pin 72 provided on the bell crank 25.

The various elements of the roll actuating and wheel shifting mechanisms are dimensioned and related so that when the implement is in working position the pin 72 is spaced substantially from the lower end of the slot 71 as shown in FIG. 3. Accordingly, the shaft 38 may be rocked through an angle sufficient to relieve the pressure on the top roll 21, raising the implement slightly but before any movement of the roll 21 occurs. Thereafter, as the shaft 38 rocks through the remainder of its range to raise the implement to transport position, the pin reaches the end of the slot and is carried along, each of the bell cranks 25 being swung counterclockwise to raise the roll 21 from the roll 20 as shown in FIG. 8. It will be appreciated that the roll lifting means above described may be disconnected or entirely omitted if desired without affecting the operation of the roll tensioning mechanism above described.

Figure 5:
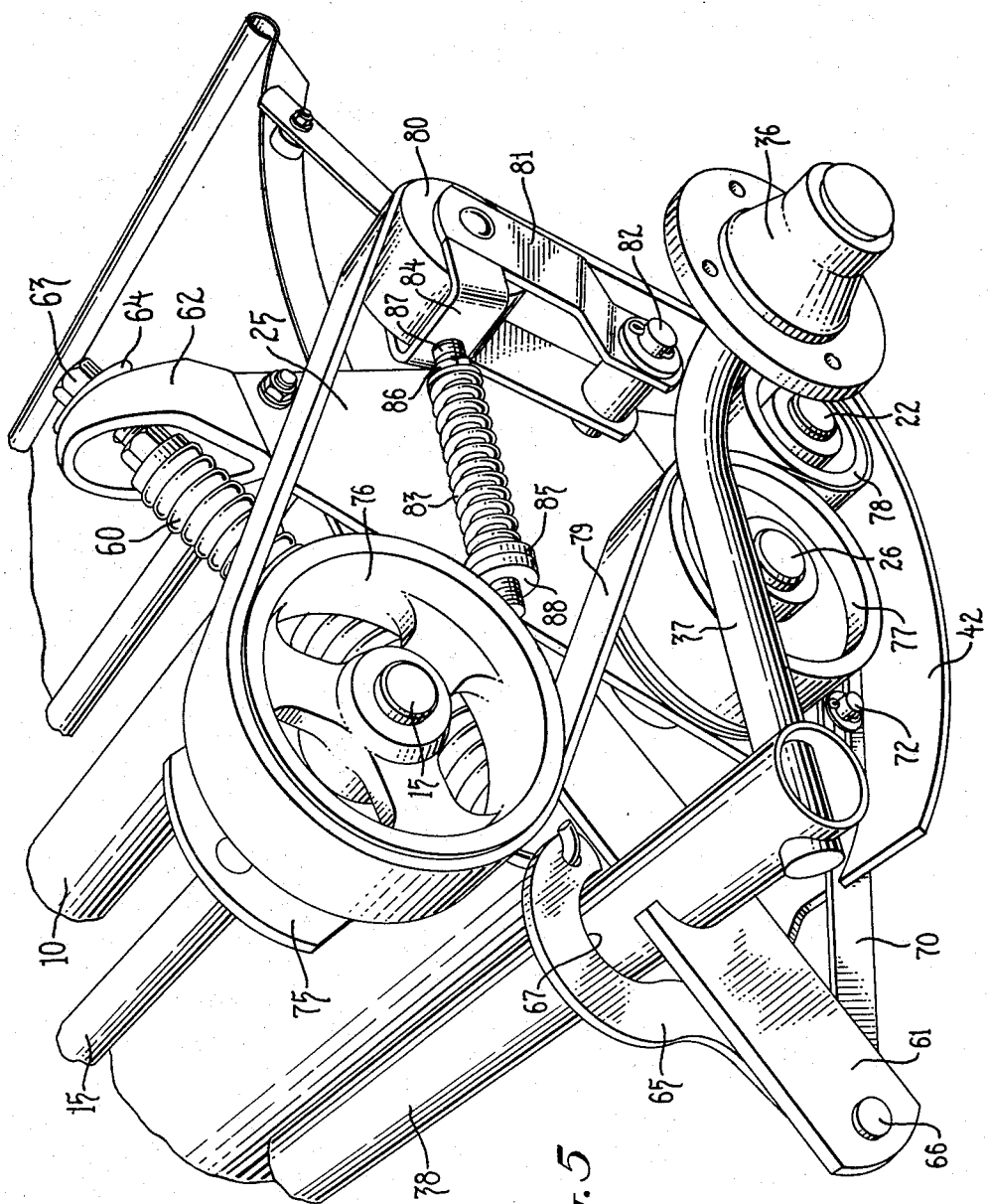
FIG. 5 is a fragmentary perspective view taken from the left side of the hay crusher, the left ground wheel being omitted to show details of the roll drive mechanism.
Figure 6:
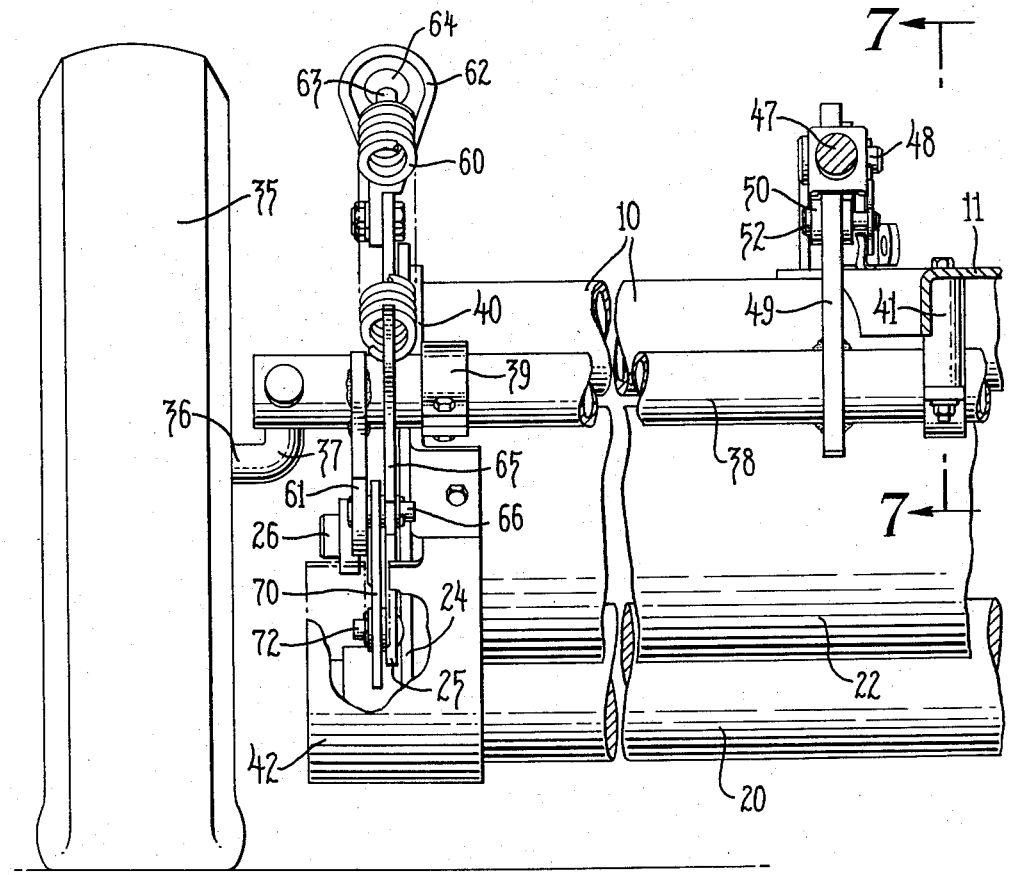
FIG. 6 is a fragmentary partly sectioned view of the right side of the hay crusher as viewed from the front.

Means is provided for driving the crushing rolls 20 and 21 from the power shaft 15 mentioned heretofore. As shown in FIG. 2, the shaft extends from the bevel gear box 13 toward the left side of the implement and is journaled adjacent its end in the bearing carried by a bracket 75 (FIG. 5) suitably secured to the main frame. A pulley 76 fixed to the shaft 15 is alined with pulleys 77 and 78 respectively fixed to the shafts 26 and 22 of the upper and lower crushing rolls. A belt 79 is trained over the three pulleys in a manner such that the crushing rolls are oppositely driven in directions effective to draw in and crush crop material presented at the front of the implement.

Any preferred means may be provided for maintaining the belt 79 under tension. As herein shown the belt tensioning means comprises an idler pulley 80 journaled at the upper end of a bracket 81 which is pivotally supported at its lower end by a pin 82 on the bell crank 25 at the left side of the implement. A compression spring 83 interposed between a yoke 84 attached to the upper end of the bracket and an abutment 85 carried on the bell crank 25 urges the idler pulley in a direction to maintain the belt 79 under tension. In the particular embodiment shown, the spring 83 seats against a stop nut 86 threaded on a rod 87 which, in turn, has a threaded connection with the yoke 84. The rod extends back through the spring and through the abutment 85. A second stop nut 88 threaded on the rod 87 adjacent the outer face of the abutment 85 provides convenient means for adjusting the limit position to which the idler pulley may be shifted by the spring 83.

In the operation of a hay crushing implement equipped with crushing roll tensioning means of the character provided by the invention, the rolls are lowered to working position by opening the exhaust from the cylinder 45, thus allowing the implement to descend under the influence of its own weight. In this descent the rock shaft 38 is rotated clockwise from the position shown in FIG. 8 to the position shown in FIG. 3. During the initial portion of the movement, the bell cranks 25 journaling the upper roll 21 swing clockwise under the urging of the springs 60 to bring that roll into contact with the lower roll 20. Such contact occurs when the implement is still substantially above the working position.

Continued downward movement of the implement during which the shaft 38 is rocked through the remainder of its range applies increased tension to the spring 60. The upper roll 21 is thus increasingly loaded or urged against the lower roll 20. As the implement moves into working position, the pivot connecting crank arm 61 and link 65 passes over dead center position, thereby locking the tensioning mechanism with the spring 60 fully tensioned.

Since the force of the spring 60 is exerted radially of the shaft 38 with the linkage in the over center position, no torque is imposed on the shaft by the spring even when the pressing rolls are forced apart by slugs of crop material stuck to or passing between the rolls. Such separation of the rolls merely extends the springs 60 but exerts no lifting effect on the implement. Excessive stressing of the rolls or their supporting structure is thus avoided. It is to be particularly noted that while the force for tensioning the springs 60 is derived entirely from the weight of the implement through the action of the wheel supporting rock shaft 38, the tensioning mechanism is so related to the shaft that there is no tendency for the rolls to bounce when the implement traverses rough ground.

The novel mechanism for applying pressure to the crushing rolls 20, 21 permits the rolls to be cleared of material sticking to the rolls without requiring them to be separated or the implement to be raised all the way to transport position. Operation of the implement raising means including the rock shaft 38 through the initial portion of its range relieves the tension on the spring 60 sufficiently to permit removal of crop material stuck to the rolls. This saves considerable time and materially reduces the expenditure of tractor power.

If desired the tensioning mechanism may be arranged to separate the crushing rolls when the implement is raised to transport position. Through the lost motion connection between the links 70 and the bell cranks 25 the lifting action is confied to the upper portion of the range of movement of the rock shaft 38, that is, after the tension on the upper crushing roll has been relieved substantially.

It will be apparent from the foregoing that the invention provides roll tensioning means of novel and advantageous character for implements for crushing hay and other forage crops. The mechanism is simple in construction and dependable in operation. It permits clearing of the rolls of crop material which adheres to them without requiring raising of the implement all the way to transport position. The improved tensioning mechanism is further advantageous in that while it utilizes the weight of the implement for tensioning purposes, nevertheless it is related to the implement raising mechanism in a manner such that the rolls can be separated by crop material without imposing excessive stresses on the rolls or their supporting structure.

We claim as our invention:

1. In a hay crushing implement having a main frame with a draft member adapted to be coupled to a towing vehicle, the combination of a rock shaft journaled on and extending transversely of the frame, arms projecting radially at opposite ends of said shaft respectively journaling a pair of ground wheels, a hydraulic actuator connected to said rock shaft and adapted to rock the same between transport and working positions, a pair of rigid legs depending at opposite sides of the main frame, a lower crushing roll rotatably supported on said legs, a pair of bell cranks respectively pivoted intermediate their ends on said legs above said lower roll, each said bell crank having a pair of arms, an upper crushing roll rotatably supported on one of the arms of each bell crank with its axis parallel to the axis of said lower roll and in position to move toward and from the lower roll incident to the rocking said bell cranks, and spring means connected between the other arms of said bell cranks and said rock shaft operative to yieldably urge said upper roll against said lower roll incident to the rocking of said shaft to working position.

2. In a hay crushing implement having a main frame with a draft member adapted to be coupled to a towing vehicle, the combination of a rock shaft journaled on and extending transversely of the frame, arms projecting radially at opposite ends of said shaft respectively journaling a pair of ground wheels, a hydraulic actuator connected to said rock shaft and adapted to rock the same between transport and working positions, a pair of rigid legs depending at opposite sides of the main frame, a lower crushing roll rotatably supported on said legs, a pair of bell cranks respectively pivoted intermediate their ends on said legs above said lower roll, each said bell crank having a pair of arms, an upper crushing roll rotatably supported on one of the arms of each bell crank with its axis parallel to the axis of said lower roll and in position to move toward and from the lower roll incident to the rocking of said bell cranks, a crank arm rigid with and projecting radially from said rock shaft, and spring means connected between the other arm of said bell crank and said crank arm operative to yieldably urge said upper roll against said lower roll upon rocking of said shaft to working position.

3. In a hay crushing implement having a main frame with a draft member adapted to be coupled to a towing vehicle, the combination of a rock shaft journaled on and extending transversely of the frame, arms projecting radially at opposite ends of said shaft respectively journaling a pair of ground wheels, a hydraulic actuator connected to said rock shaft and adapted to rock the same between transport and working positions, a pair of rigid legs depending at opposite sides of the main frame, a lower crushing roll rotatably supported on said legs, a pair of bell cranks respectively pivoted intermediate their ends on said legs above said lower roll, an upper crushing roll rotatably supported on each said bell crank with its axis parallel to the axis of said lower roll and in position to move toward and from the lower roll incident to the rocking of said bell cranks, a crank arm rigid with and projecting radially from said rock shaft, a tension spring connected at one end to one of said bell cranks, and a link connecting the other end of said spring with said crank arm whereby said spring is tensioned so as to yieldably urge said upper roll against said lower roll incident to the rocking of said shaft to working position, said link having a curved portion adapted to afford clearance for said rock shaft when rocked into a position to substantially aline said crank arm with the axis of said spring whereby said spring is precluded from exerting torque on said shaft.

4. In a hay crushing implement having a main frame with a draft member adapted to be coupled to a towing vehicle, the combination of a pair of crushing rolls supported on said frame for rotation about parallel axes and for relative movement toward and from each other, spring means connected with the supports for one of said rolls and operative when tensioned to yieldably urge it against the other roll, ground wheels supporting said frame movable vertically to raise and lower the implement between working and transport positions, a rock shaft journaled on the frame operative to move said wheels, means connected with said rock shaft and said spring means for tensioning the latter incident to the lowering of the implement to working position, said tensioning means including locking means effective to relieve said rock shaft of torque load produced by said spring means.

5. In a hay crushing implement having a main frame with a draft member adapted to be coupled in towing relation to a tractor and a power shaft adapted to be connected to and driven by the tractor's power-take-off shaft, the combination of a pair of crushing rolls supported on said frame for rotation about parallel axes, the supports for one of said rolls including a pair of bell cranks pivotally mounted on the frame and operative to move said one roll toward and from the other roll when rocked about their pivots, ground wheels supporting the main frame and movable vertically relative thereto to raise and lower the frame and shift the crushing rolls between working and transport positions, spring means acting on said bell cranks tensioned incident to the movement of the crushing rolls to working position for yieldably urging the rolls together, means for driving said rolls including alined pulleys fixed to the power shaft and to the respective rolls, an endless belt trained over said pulleys, means for maintaining said belt under tension including a bracket pivotally mounted on one of said bell cranks, an idler pulley journaled on said bracket in position to engage said belt, and spring means interposed between said bracket and an abutment on said one bell crank urging the bracket in a direction to press said idler pulley against said belt.

6. In a hay crushing implement having a main frame with a draft member adapted to be coupled to a towing vehicle, the combination comprising a lower crushing roll journaled on the main frame, support means pivotally mounted on the main frame, an upper crushing roll journaled on said support means with its axis substantially parallel to the axis of said lower roll and disposed for movement with said support means toward and from said lower roll, a rock shaft journaled on and extending transversely of the main frame, arms projecting radially at opposite ends of said rock shaft, a pair of ground wheels journaled on respective ones of said projecting arms, said ground wheels and said radial arms and said rock shaft supporting said implement for vertical movement between a lowered working position and a raised transport position, spring means connected with said pivotally mounted support means and with said rock shaft, means for tensioning said spring means when said implement is in lowered position and for releasing tension on said spring means as an incident to raising the implement toward transport position, and means for sequentially separating said upper roll from said lower roll following release of tension on said spring means as an incident to raising the implement toward transport position.

7. In a hay crushing implement having a main frame with a draft member adapted to be coupled to a towing vehicle, the combination comprising a lower crushing roll journaled on the main frame, bell crank means pivotally mounted on the main frame, an upper crushing roll journaled on said bell crank means with its axis substantially parallel to the axis of said lower roll and disposed for movement with said bell crank means toward and from said lower roll, a rock shaft journaled on and extending transversely of the main frame, arms projecting radially at opposite ends of said shaft, a pair of ground wheels journaled on respective ones of said projecting arms, said ground wheels and said radial arms and said rock shaft supporting said implement for vertical movement between a lowered working position and a raised transport position, spring means connected with said bell crank means, a first means connecting said spring means with said rock shaft for tensioning said spring means when the implement is in said lowered position, said first means being adapted to release tension on said spring means as an incident to raising the implement toward transport position, and a second means connecting said bell crank means with said rock shaft independently of said first means and constructed and arranged to separate said upper roll from said lower roll following release of tension on said spring means.

8. In a hay crushing implement having a main frame with a draft member adapted to be coupled to a towing vehicle, the combination of a lower crushing roll rotatably supported on the main frame, an upper crushing roll, means pivotally mounted on the main frame and rotatably supporting said upper crushing roll with its axis substantially parallel to the axis of said lower roll and for movement toward and from the lower roll, a rock shaft journaled on the main frame, a pair of ground wheel arms on said rock shaft, a pair of ground wheels journaled on respective ones of said arms and supporting the implement for vertical movement between a lowered working position and a raised transport position, a crank arm on said rock shaft, spring means connected with said pivotal mounting means, a first link connected between said spring means and said crank arm of said rock shaft, said first link being adapted to tension said spring means so as to maintain said upper roll in pressed engagement with said lower roll when the implement is in said lowered working position, said first link also being adapted to relieve tension on said spring means upon raising the implement toward transport position, and a second link connected between said pivotal mounting means and said crank arm of said rock shaft for operation independently of said first link, said second link having a lost motion connection with said pivotal mounting means constructed and arranged to separate said upper roll from said lower roll after tension on said spring means has been substantially relieved.

9. In a hay crushing implement having a main frame with a draft member adapted to be coupled to a towing vehicle, the combination of a lower crushing roll rotatably supported on the main frame, an upper crushing roll, means pivotally mounted on the main frame and rotatably supporting said upper crushing roll with its axis substantially parallel to the axis of said lower roll and for movement toward and from the lower roll, a rock shaft journaled to the main frame, a pair of ground wheel arms on said rock shaft, a pair of ground wheels journaled on respective ones of said arms and supporting the implement for vertical movement between a lowered working position and a raised transport position, a pair of crank arms on said rock shaft, a pair of spring means connected with said pivotal mounting means, a pair of first links connected between respective ones of said spring means and said crank arms, said first links being adapted to tension said spring means so as to maintain said upper roll in pressed engagement with said lower roll when the implement is in said lowered working position, said first links also being adapted to relieve tension on said spring means upon raising the implement toward transport position, and a pair of second links connected between said pivotal mounting means and said crank arms for operation independently of said first links, said second links having a lost motion connection with said pivotal mounting means constructed and arranged to separate said upper roll from said lower roll after tension on said spring means has been substantially relieved.

References Cited in the file of this patent

UNITED STATES PATENTS

| | | | |
|---|---|---|---|
| 2,924,927 | Pristo | Feb. 16, | 1960 |
| 2,932,143 | Morkoski | Apr. 2, | 1960 |
| 2,989,830 | Pristo | June 27, | 1961 |